United States Patent
Kondou et al.

(10) Patent No.: US 7,660,493 B2
(45) Date of Patent: Feb. 9, 2010

(54) OPTICAL MODULATOR

(75) Inventors: Katsutoshi Kondou, Tokyo (JP); Satoshi Oikawa, Tokyo (JP); Takashi Shinriki, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 11/389,809

(22) Filed: Mar. 27, 2006

(65) Prior Publication Data

US 2007/0122072 A1 May 31, 2007

(30) Foreign Application Priority Data

Mar. 31, 2005 (JP) ............................. 2005-105402

(51) Int. Cl.
- *G02F 1/035* (2006.01)
- *G02F 1/295* (2006.01)
- *G02B 6/26* (2006.01)
- *G02B 6/42* (2006.01)

(52) U.S. Cl. .................. 385/8; 385/2; 385/31; 385/39; 385/45

(58) Field of Classification Search .............. 385/8, 385/2, 31, 39, 458
See application file for complete search history.

(56) References Cited

U.S. PATENT DOCUMENTS

2005/0039322 A1 * 2/2005 Kondo et al. ............... 29/592.1
2007/0147722 A1 * 6/2007 Kondo et al. ................. 385/2

FOREIGN PATENT DOCUMENTS

| JP | 64-018121 | 1/1989 |
| JP | 06-289341 | 10/1994 |
| JP | 2003-215519 | 7/2003 |

* cited by examiner

*Primary Examiner*—Frank G Font
*Assistant Examiner*—Jerry Blevins
(74) *Attorney, Agent, or Firm*—Chapman and Cutler LLP

(57) ABSTRACT

An optical modulator is provided. The optical modulator includes a thin plate made of an electrooptic material and having a thickness of 20 μm or less, an optical waveguide formed on a top or bottom surface of the thin plate, and a modulation electrode formed on the top surface of the thin plate to modulate light passing through the optical waveguide, wherein, in a shape of the thin plate, a width of the thin plate at an optical input portion or optical output portion of the optical waveguide is two time or less the thickness of the thin plate.

18 Claims, 4 Drawing Sheets ns to a thickness direction of the thin plate) is weakened, so that the light distribution spreads in the horizontal direction. Particularly, if the thickness of the substrate is reduced down to 20 μm or less, a vertical light distribution, that is, a light distribution in a vertical direction (that is, the thickness direction of the thin plate) has a large difference from the horizontal light distribution. Moreover, if the thickness of the substrate is reduced down to 10 μm or less, the difference between the vertical and horizontal light distributions increases greatly.

OPTICAL MODULATOR

BACKGROUND OF THE INVENTION

1. Field of the Invention

The present invention relates to an optical modulator, and more particularly, to an optical modulator including a thin plate having an electrooptic effect and having a thickness of 20 μm or less and a reinforcement plate having a thickness lager than that of the thin plate.

2. Related Art Statement

In the related art, waveguide-type optical modulators having optical waveguides or modulation electrodes formed on a substrate having an electrooptic effect have been widely used for optical communication fields or optical measurement fields.

Particularly, an amount of information transmission increases as multimedia technology is developed. Therefore, there is a need for a wide frequency band modulation technology in an optical modulator. In order to implement the wide frequency band modulation, various external modulation schemes with an LN (lithium niobate) modulator or the like are used. However, in order to implement the wide frequency band modulation with the LN modulator, there is a need for velocity matching between an optical wave and a microwave, that is, a modulation signal and decrease in driving voltage.

As one of means for solving the problem, a technique of satisfying the condition of velocity matching between the optical wave and the microwave and decrease in the driving voltage by using a thin substrate has been conventionally known.

In JPA S64-18121 and JPA 2003-215519, an optical waveguide and an modulation electrode are disposed in a thin substrate (hereinafter, referred to as a first substrate) having a thickness of 30 μm or less, and after that, a substrate (hereinafter, referred to as a second substrate) having a dielectric constant lower than that of the first substrate is attached to the first substrate. By doing so, an effective refractive index with respect to a microwave is reduced, so that velocity matching between the microwave and an optical wave is obtained, and a mechanical strength of the substrate is maintained.

In JPA S64-18121 and JPA 2003-215519, the first substrate is mainly made of LiNbO$_3$ (hereinafter, referred to as LN), and the second substrate is made of a material having a dielectric constant lower than that of the LN, such as quartz, a glass, and an aluminum oxide. In the combination of these materials, due to a difference between linear expansion coefficients thereof, temperature drift or DC drift occurs according to change in temperature. Particularly, in JPA 2003-215519, in order to remove such defect, the first and second substrates are attached to each other by using an adhesive having a linear expansion coefficient close to that of the first substrate.

However, in comparison to an optical modulator fabricated by using the conventional LN substrate, an optical modulator fabricated by using a thin-plate LN substrate has a larger amount of coupling loss between an optical fiber and an optical waveguide formed on the substrate. As a result, insertion loss of the optical modulator increases.

Therefore, the inventors have done researched to determine the cause of the increase in the coupling loss between the optical fiber and the optical waveguide formed on the substrate. Finally, the increase in the coupling loss is clarified to be caused from a change in light propagation mode distribution due to a thickness of the substrate. More specifically, if the thickness of the substrate is reduced, a horizontal light confinement of the optical wave propagating along the optical waveguide in the horizontal direction (that is, a direction perpendicular to the thickness direction of the thin plate) is weakened, so that the light distribution spreads in the horizontal direction. Particularly, if the thickness of the substrate is reduced down to 20 μm or less, a vertical light distribution, that is, a light distribution in a vertical direction (that is, the thickness direction of the thin plate) has a large difference from the horizontal light distribution. Moreover, if the thickness of the substrate is reduced down to 10 μm or less, the difference between the vertical and horizontal light distributions increases greatly.

SUMMARY OF THE INVENTION

The invention provides an optical modulator having an improved coupling loss between an optical fiber and the optical modulator using a thin plate having a thickness of 20 μm or less.

According to a first aspect of the invention, there is provided an optical modulator including a thin plate made of an electrooptic material and having a thickness of 20 μm or less, an optical waveguide formed on a top or bottom surface of the thin plate, and a modulation electrode formed on the top surface of the thin plate to modulate light passing through the optical waveguide, wherein, in a shape of the thin plate, a width of the thin plate at an optical input portion or an optical output portion of the optical waveguide is two times or less the thickness of the thin plate. In the present invention, the "width of the thin plate" denotes a width of an end portion of the thin plate including the optical waveguide. In addition, in a case where the end portion has a shape of ridge, the width of the thin plate denotes a width of the ridge portion.

In addition, the number of "two times" specifies a preferred number for obtaining the effects of the present invention. Therefore, even in a number of slightly exceeding the "two times", if the coupling loss between the optical fiber and the optical modulator can be expected to be improved, the number should be understood to be included in the scope of the invention. In addition, in a case where the horizontal light distribution of the optical waveguide formed on the thin plate is larger than the light diffusion of the optical fiber, the effect of the first aspect appears greatly.

According to a second aspect of the invention, there is provided an optical modulator according to the first aspect of the invention, wherein the thickness of the thin plate is 10 μm or less.

According to a third aspect of the invention, there is provided an optical modulator according to the first or second aspect of the invention, wherein, at an optical input portion or an optical output portion of the optical waveguide, a width of the thin plate gradually changes along the optical waveguide.

According to a fourth aspect of the invention, there is provided an optical modulator according to any one of the first to third aspects of the invention, wherein the thin plate has a shape of cutaway portion.

According to a fifth aspect of the invention, there is provided an optical modulator including a thin plate, an optical waveguide made of an electrooptic material and formed on a top or bottom surface of the thin plate, and a modulation electrode formed on the top surface of the thin plate to modulate light passing through the optical waveguide, wherein, at a portion where the modulation electrode is formed, a thickness of the thin plate is 20 μm or less, and wherein a thickness of an end portion of the thin plate at an optical input portion or an optical output portion of the optical waveguide is 1.1 times or more the thickness of the thin plate at the portion where the modulation electrode is formed.

According to a sixth aspect of the invention, there is provided an optical modulator according to the fifth aspect of the invention, wherein, at the end portion of the thin plate at the optical input or optical output portion of the optical waveguide, an external member having substantially the same refractive index as the thin plate is disposed on the top or bottom surface of the thin plate.

According to a seventh aspect of the invention, there is provided an optical modulator according to the fifth or sixth aspect of the invention, wherein a width of the end portion of the thin plate at the optical input or optical output portion of the optical waveguide is two times or less a total thickness of the end portion of the thin plate.

According to an eighth aspect of the invention, there is provided an optical modulator according to any one of the fifth to seventh aspects of the invention, wherein the end portion of the thin plate has a shape of taper of which thickness is enlarged in vicinities of the optical input and optical output portions.

According to a ninth aspect of the invention, there is provided an optical modulator according to any one of the fifth to eighth aspects of the invention, wherein the end portion of the thin plate has a shape of taper of which width is narrowed in vicinities of the optical input and optical output portions.

According to the first aspect of the invention, in the thin plate having a thickness of 20 μm or less, since the width of the thin plate at the optical input portion or the optical output portion of the optical waveguide is two times or less the thickness of the thin plate, the spreading of the horizontal light distribution at the optical input end portion or the optical output end portion can be suppressed, so that it is possible to reduce the coupling loss between the optical fiber and the optical modulator. In addition, in order to continuously change the distribution of the light propagating through the optical waveguide without loss thereof, it is preferable that the width or thickness of the thin plate is designed to continuously change along the optical waveguide.

According to the second aspect of the invention, since the thickness of the thin plate is 10 μm or less, the difference between the horizontal and vertical light confinement of the thin plate increases greatly, and the light distribution spreads in the horizontal direction. Therefore, by combining with the configuration of the first aspect, the spreading of the light in the horizontal direction can be effectively suppressed, so that it is possible to further improve the coupling loss between the optical fiber and the optical modulator.

According to the third aspect of the invention, since the width of the thin plate at the optical input portion or the optical output portion of the optical waveguide gradually changes, the loss of the light distribution at the optical input end portion or the optical output end portion can be suppressed, so that it is possible to reduce the coupling loss between the optical fiber and the optical modulator.

In addition, in a case where the width of the thin plate gradually changes along the optical waveguide to have the smallest value at the optical input portion or the optical output portion of the optical waveguide, the loss of the light distribution at the optical input end portion or the optical output end portion can be further suppressed, so that it is possible to reduce the coupling loss between the optical fiber and the optical modulator.

According to the fourth aspect of the invention, the thin plate is formed to have a shape of cutaway portion, so that the thin plate can be easily fabricated. In addition, since a small portion is removed from the thin plate, mechanical impact is small. Therefore, it is possible to prevent damage to the thin plate and to suppress decrease in mechanical strength of the thin plate.

According to the fifth aspect of the invention, since the thickness of the end portion of the thin plate at least at the optical input portion or the optical output portion of the optical waveguide is designed to be 1.1 times or more the thickness of the thin plate at the portion where the modulation electrode is formed, the light distribution of the light spreading in the horizontal direction can spread in the thickness direction of the thin plate, so that it is possible to suppress the spreading of the horizontal light distribution.

According to the sixth aspect of the invention, since the external member having substantially the same refractive index as the thin plate is disposed on the top or bottom surfaces of the thin plate at the optical input portion or the optical output portion of the optical waveguide, complicated processes for pressing the thin plate is unnecessary, so that it is possible to avoid cracks in the thin plate during the processes and to reduce the production cost.

According to the seventh aspect of the invention, since the width of the end portion of the thin plate at the optical input portion or the optical output portion of the optical waveguide is two times or less a total thickness of the end portion of the thin plate, the spreading of the horizontal light distribution at the optical input end portion or the optical output end portion can be suppressed, so that it is possible to reduce the coupling loss between the optical fiber and the optical modulator.

According to the eighth aspect of the invention, since the end portion of the thin plate has a shape of taper of which thickness is enlarged in vicinities of the optical input portion or the optical output portion of the optical waveguide, the light distribution at the end portion can change continuously without loss of the light distribution at the optical input portion or the optical output portion of the optical waveguide, so that it is possible to reduce the coupling loss between the optical fiber and the optical modulator.

According to the ninth aspect of the invention, the end portion of the thin plate has a shape of taper of which width is narrowed in vicinities of the optical input portion or the optical output portion of the optical waveguide, the end portion can change continuously without loss of the light distribution at the optical input portion or the optical output portion of the optical waveguide , so that it is possible to reduce the coupling loss between the optical fiber and the optical modulator.

Figure 1:
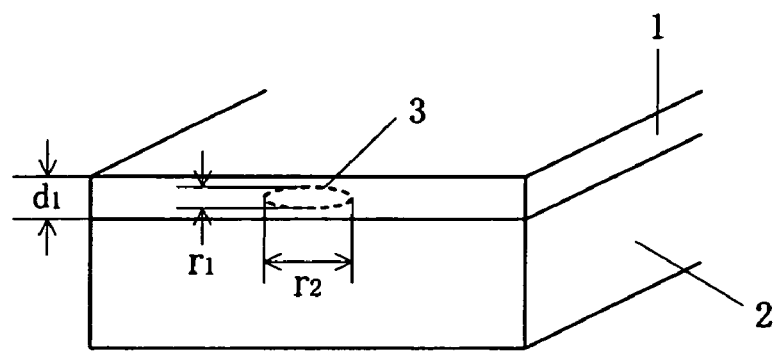
FIG. 1 is a view showing an optical input portion or an optical output portion of a conventional optical modulator.

REFERENCE NUMERALS 1, 10, 20, 30, 40, 50: thin plate
2, 31: reinforcement plate
3, 12, 22, 34: light distribution
4: optical waveguide
5: capillary
6, 7: optical fiber
11: wedge-shaped portion
21: cutaway portion
32, 33: auxiliary member
d2: width of thin plate or width of end portion of substrate at optical input portion or optical output portion

DESCRIPTION OF THE EMBODIMENTS

Now, preferred embodiments of the present invention will be described in detail.

FIG. 1 is a view showing a portion of an optical modulator using a conventional thin plate. An optical waveguide (not shown), a modulation electrode (not shown), and the like are disposed on the thin plate 1, and a reinforcement plate 2 is attached to the thin plate 1 with an adhesive. In a case where a thickness d1 of the thin plate is set to 10 μm, as shown in FIG. 1, a light distribution 3 of the optical wave at an optical input end portion or an optical output end portion of the optical waveguide through which the optical wave is inputted into or is outputted from the optical modulator has a vertical width r1 of about 8 to 9 μm and a horizontal width r2 of about 10 to 13 μm. This phenomenon is discovered by the inventors of the present invention, so that the present invention is made.

Figure 2:
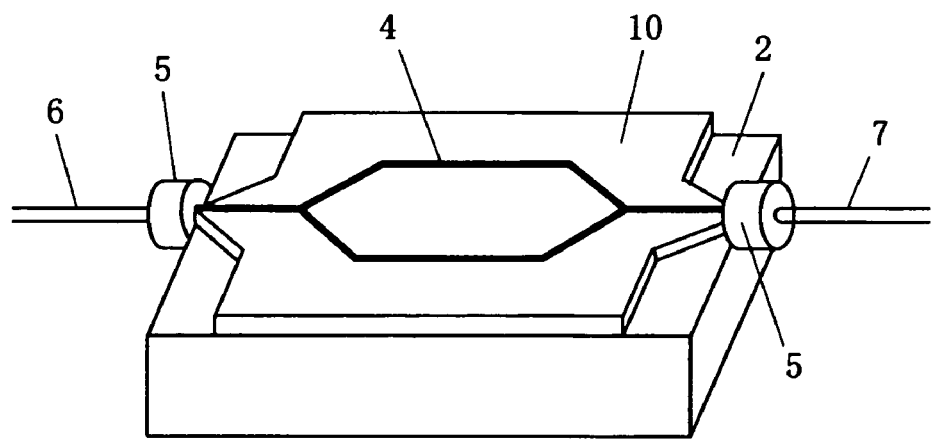
FIG. 2 is a schematic view of an optical modulator according to the invention.

FIG. 2 is a schematic view of an optical modulator according to the present invention. As shown in FIG. 2, an optical waveguide 4 is disposed on a top surface of a thin plate 10 made of a material having an electrooptic effect. In addition, a modulation electrode (not shown) such as a signal electrode or a ground electrode is disposed on the top surface of the thin plate in order to modulate an optical wave passing through the optical waveguide 4. In addition, the optical waveguide may be disposed on a bottom surface of the thin plate.

The optical waveguide may be formed by diffusing Ti or the like on the surface of the thin plate by using a thermal diffusion method or a proton exchange method. In addition, as disclosed in JPA H6-289341, a ridge may be formed on a surface of the thin plate 1 to match with a shape of an optical waveguide to constitute the optical waveguide.

The modulation electrode such as a signal electrode and a ground electrode may be formed by an electrode pattern formation of Ti/Au, a gold plating method, or the like. In addition, as needed, a buffer layer (not shown) made of a dielectric material of $SiO_2$ or the like may be formed on the surface of the thin plate where the optical waveguide is formed, and after that, the modulation electrode may be formed on the buffer layer.

The material having an electrooptic effect may include, for example, lithium niobate, lithium tantalite, PLZT (lead lanthanum zirconate titanate), a quartz-based material, and a combination thereof. In particular, a lithium niobate (LN) crystal which has a good electrooptic effect may be suitably used.

In the formation of the thin plate having an optical modulation device, the aforementioned optical waveguide is formed on a substrate having a thickness of several hundreds of micrometers, and a bottom surface of the substrate is polished to form the thin plate having a thickness of 20 μm or less. After that, the modulation electrode is formed on the surface of the thin plate. In addition, after the formation of the optical waveguide and the modulation electrode, a bottom surface of the substrate may be polished. If a thermal impact or a mechanical impact is exerted on the thin plate during the formation of the optical waveguide or during the various processes, the thin plate may be damaged. Therefore, it is preferable that such processes for exerting the thermal impact or the mechanical impact is performed before the process of polishing the substrate into the thin plate.

Various materials may be used for the reinforcement plate. For example, the same material as the thin plate may be used. In addition, a material such as quartz, glass, and aluminum oxide having a lower dielectric constant than that of the thin plate may used. Alternatively, such material disclosed in JPA H6-289341 having a different crystal orientation from that of the thin plate may be used. Here, it is preferable that a material having the same linear expansion coefficient of the thin plate is used in order to stabilize a modulation characteristic of the optical modulator according to change in temperature. Alternatively, if it is difficult to use the material having the same linear expansion coefficient of the thin plate, an adhesive (for attaching the thin plate and the reinforcement plate) having the same linear expansion coefficient of the thin plate may be used as disclosed in JPA 2003-215519.

The thin plate 1 and the reinforcement plate 3 may be attached by using various adhesive materials such as an epoxy-based adhesive, a thermosetting adhesive, a UV-curing adhesive, a solder glass, a thermosetting resin adhesive sheet, a photocuring resin adhesive sheet, or a phototackifier resin adhesive sheet.

Referring to FIG. 2, the optical modulator is connected to an input optical fiber 6 and an output optical fiber 7. The optical fibers 6 and 7 are directly fixed to the optical modulator with an adhesive by using cylindrical capillaries 5 into which the optical fibers are inserted.

Figure 3:
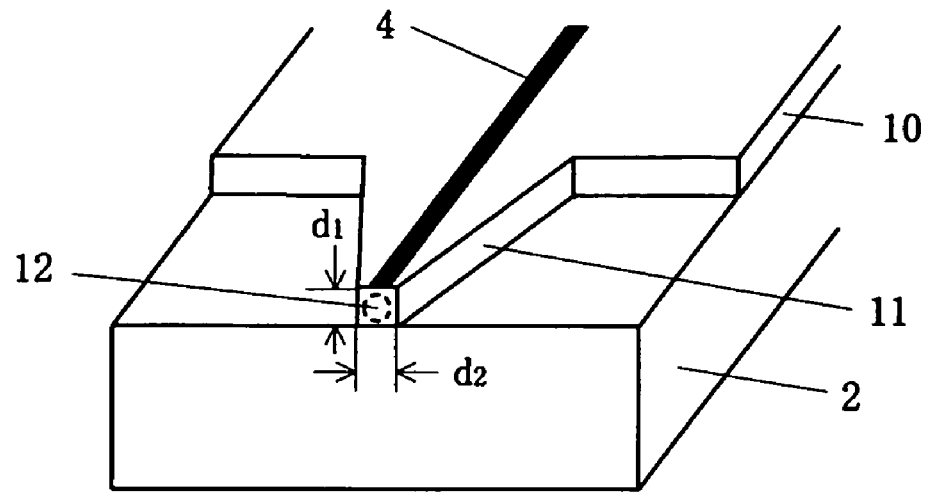
FIG. 3 is a view showing an optical input portion or an optical output portion of the optical modulator shown in FIG. 2.

FIG. 3 is an enlarged view showing an optical input portion or an optical output portion of the optical modulator shown in FIG. 2. According to the present invention, in a shape of the thin plate, a width d2 of the thin plate at the optical input or optical output portion of the optical waveguide is substantially the same as a thickness d1 of the thin plate, and the width of the thin plate is gradually enlarged along the optical waveguide. More specifically, as shown in FIG. 3, a portion of the thin plate 10 is cut so as to allow the width d2 of the thin plate at the end portion of the optical waveguide to be substantially the same as a size of light distribution of the optical fiber and to allow the width of the thin plate to be gradually enlarged along the optical waveguide 4. As a result, a wedge-shaped portion 11 is formed. The shape of the thin plate 10 shown in FIG. 3 may be formed by a mechanical cutting process with a dicing saw or a chemical etching process.

As indicated by reference numeral 12, due to the shape of the thin plate 10 of FIG. 3, in the light distribution at the optical input or optical output end portion of the optical waveguide, a horizontal light distribution is confined, so that an aspect ratio thereof is approximate to 1.

In addition, in a relation of the width d2 and thickness d1 of the thin plate according to the present invention, it is preferable that the width d2 is two times or less the thickness d1 of the thin plate. Here, the "two times" should be understood not to exclude a case of "more than two times". Even in a case of "slightly more than two times", the horizontal light confinement of the thin plate is enforced by shortening the width of the thin plate, so that the horizontal light distribution can be approximately equal to the vertical light distribution.

Figure 4:
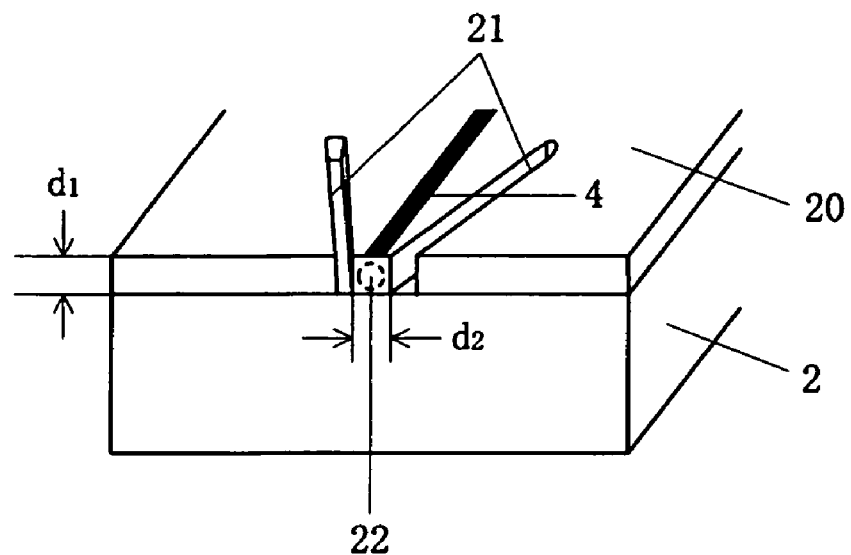
FIG. 4 is a view showing an optical input portion or an optical output portion of an optical modulator having a cutaway portion.

Instead of the example shown in FIG. 3, as an alternative example shown in FIG. 4, cutaway portions 21 may be formed on the thin plate 20, so that the horizontal light confinement at the optical input or optical output portion of the optical waveguide 4 can be enforced. The cutaway portions 21 may be easily formed by a cutting process with a dicing saw. Reference numeral 22 denotes the light distribution at the end portion. In addition, as needed, the cutaway portions 21 may be filled with a light shielding material.

Figure 8:
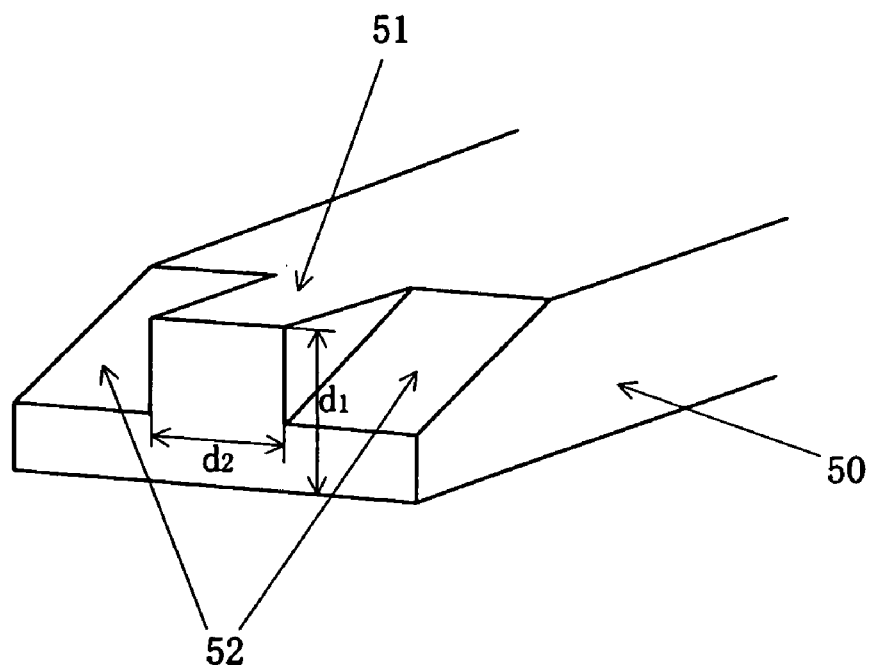
FIG. 8 is a view showing an optical input portion or an optical output portion of an optical modulator having a protrusion member formed by cutting a portion of a substrate.

Particularly, as shown in FIG. 3, if the cutaway portions are enlarged, mechanical impact exerted on the thin plate increases. Therefore, the thin plate may be easily broken. In addition, the mechanical strength of the thin plate may seriously deteriorate. On the contrary, if the cutaway portions 21 shown in FIG. 4 are formed, load exerted on the thin plate can be reduced. In some cases, after a reinforcement plate is attached to the thin plate, the cutaway portions may be formed so as to suppress damage to the thin plate. In addition, as shown in FIG. 8, a portion of the thin plate 50 may be cut to form a cutaway portion 52, so that the width d2 of the thin plate at the end portion 51 thereof can have a predetermined value.

Now, an optical modulator according to another embodiment of the present invention will be described with reference to FIG. 5.

Figure 5:
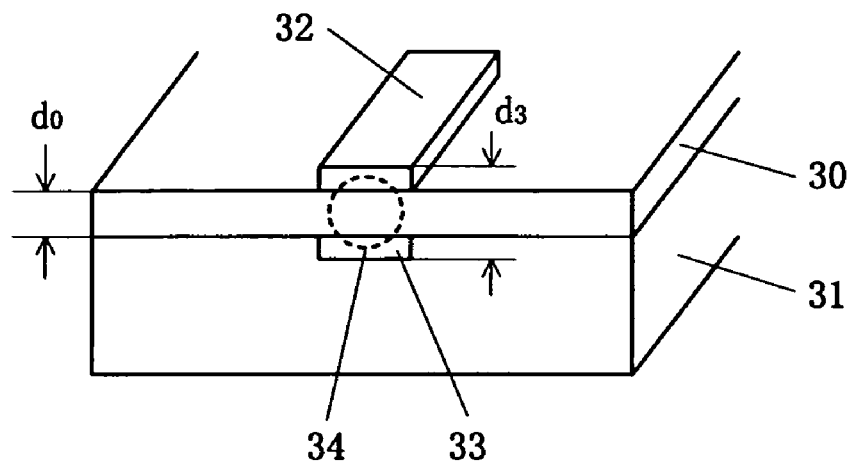
FIG. 5 is a view showing an optical modulator according to another embodiment of the invention.

Referring to FIG. 5, at the optical input or optical output portion of the optical waveguide, auxiliary members 32 and 33 having the same refractive index as the thin plate are disposed as external members on the top and bottom surfaces of the thin plate 30. More specifically, the auxiliary members having a shape of plate and a thickness equal to or less than that of the thin plate may be directly bonded on the top and bottom surfaces of a light-input or light-output portion of the thin plate. Alternatively, the auxiliary members may be stacked on the upper and lower surfaces of the light-input or light-output portion of the thin plate. Instead of disposing the auxiliary members 32 and 33 as the external members, the auxiliary members are integrally formed in the thin plate as shown in FIG. 5.

According to such configuration, it is possible to lessen the vertical light confinement of the thin plate at the optical input or optical output portion. In addition, it is possible to allow the horizontal light distribution at the optical input or optical output end portion to be approximate to the vertical light distribution. Reference numeral 34 denotes the light distribution at the end portion.

In the present invention, it is preferable that a thickness d3 of the end portion of the thin plate at the optical input or optical output portion of at least the optical waveguide is 1.1 times or more a thickness d0 of a portion where the modulation electrode is formed. However, in FIG. 5, the thickness of the thin plate 30 is formed to be uniform. According to such configuration, the horizontal light distribution may spread in the thickness direction, so that it is possible to suppress the horizontal light distribution from spreading.

Figure 6:
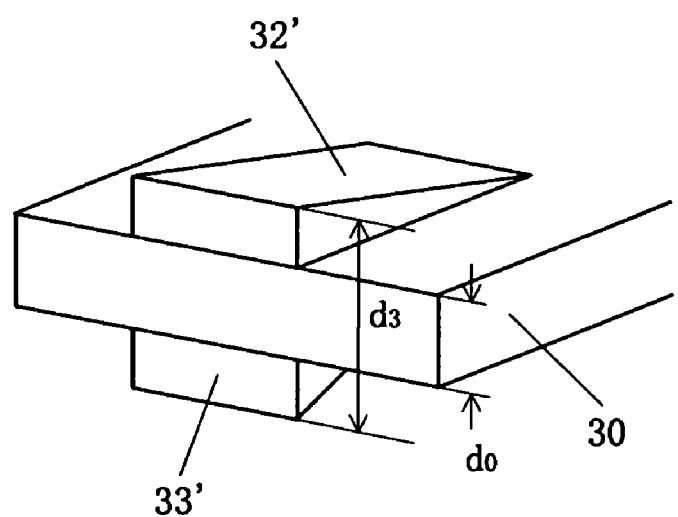
FIG. 6 is a view showing an optical input portion or an optical output portion of the optical modulator having an auxiliary member having a tapered shape shown in FIG. 5.

Alternatively, as shown in FIG. 6, auxiliary members 32' and 33' having a shape of taper of which thickness is enlarged in the vicinity of the optical input or optical output end portion of the thin plate may be disposed on the top and bottom surfaces of the thin plate 30. According to such configuration, in addition to the effect of the optical modulator shown in FIG. 5, the light distribution at the optical input or optical output end portion of the thin plate can change continuously without loss of the light, so that it is possible to further reduce the coupling loss between the optical fiber and the optical modulator.

Figure 7:
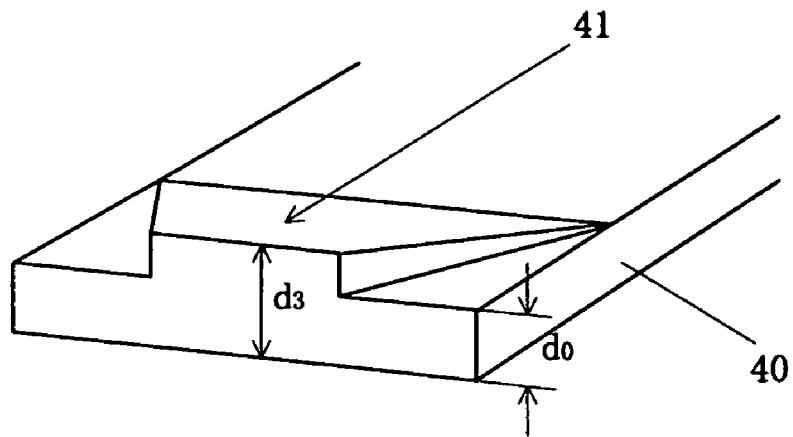
FIG. 7 is a view showing an optical input portion or an optical output portion of an optical modulator having a protrusion member having a tapered shape.

In addition, as shown in FIG. 7, the end portion 41 of the thin plate 40 may be formed by processing the thin plate so as to have a shape of taper of which thickness change continuously in the vicinity of the optical input or optical output end portion of the thin plate.

In addition, by a combination of the configuration where the horizontal width of the thin plate is shortened as shown in FIG. 3 and the configuration where the external members are disposed on the top and bottom surface of the thin plate shown in FIG. 5 or the configuration where the vertical thickness of the thin plate is enlarged, the width of the thin plate and a total thickness of the thin plate and the external members at the optical input or optical output portion of the optical waveguide are adjusted to arbitrarily control a degree of the horizontal light confinement and a degree of the vertical light confinement. As a result, it is possible to further reduce the coupling loss between the optical fibers and the optical modulator.

EXAMPLES

Now, examples of the optical modulator according to the present invention and test thereof will be described.

First Example

In a first example, in order to fabricate a thin-plate optical modulation device, an X-cut LN substrate having a thickness of 500 µm is used. An optical waveguide is formed on the surface of the substrate by using a Ti diffusion process or the like. A bottom surface of the substrate is polished to allow a thickness thereof to be 10 µm by using a polishing machine, and after that, a reinforcement plate is attached on the bottom surface of the substrate by using a UV-curing adhesive. After that, as shown in FIG. 3, a wedge-shaped portion 11 having a width d2 of 10 µm at the optical input portion, a length of 2 µmm, and an angle of 0.5° with respect to the optical waveguide is formed by using a dry etching apparatus. Next, a modulation electrode having a height of 14 µm is formed by using a plating process, so that the optical modulator is completed.

First Comparative Example

An optical modulator is fabricated without the thin plate dry etching process of the first example.

Second Example

In a second example, in order to fabricate a thin-plate optical modulation device, an X-cut LN substrate having a thickness of 500 µm is used. An optical waveguide is formed on the surface of the substrate by using a Ti diffusion process or the like. A bottom surface of the substrate is polished to allow a thickness thereof to be 7 µm by using a polishing machine, and after that, a reinforcement plate is attached on the bottom surface of the substrate by using a UV-curing adhesive. Next, a high refractive index layer having a shape of taper with a dimension of 1 mm (width)×2 µmm (depth)×3 µm (thickness of end portion) is formed on the surface of the substrate.

Second Comparative Example

An optical modulator is fabricated without the thin plate high refractive index formation process of the second example.

Test Method

Optical modulation devices of the first and second examples and the first and second comparative examples are connected to an optical fiber. Next, relative values of coupling loss between the optical fiber and the optical modulation devices are measured with an optical power meter. Results of the measurement are shown in Table 1.

TABLE 1

|  | LOSS[dB] |
| --- | --- |
| FIRST COMPARATIVE EXAMPLE | 3.2 |
| FIRST EXAMPLE | 2.7 |
| SECOND COMPARATIVE EXAMPLE | 3.3 |
| SECOND EXAMPLE | 2.7 |

Referring to the results shown in Table 1, it can be understood that the coupling loss between the optical fiber and the optical modulators according to the first and second examples is improved in comparison to the optical modulators of the first and second comparative examples.

As described above, according to the present invention, it is possible to improve a coupling loss between an optical fiber and an optical modulator using a thin plate having a thickness of 20 μm or less.

What is claimed is:

1. An optical modulator comprising
a thin plate made of an electrooptic material and having a thickness of 20 μm or less,
an optical waveguide formed on a top or bottom surface of the thin plate, and
a modulation electrode comprising a signal electrode and a ground electrode formed on the top surface of the thin plate to modulate light passing through the optical waveguide,
wherein the thickness of the thin plate is constant throughout a portion of the thin plate where the modulation electrode is formed, and the thickness of the thin plate is 20 μm or less throughout the portion of the thin plate where the modulation electrode is formed, and
wherein, in a shape of the thin plate, a width of the thin plate at a non-branched optical input portion or at a non-branched optical output portion of the optical waveguide is two times or less the thickness of the thin plate.

2. The optical modulator according to claim 1, wherein the thickness of the thin plate is 10 μm or less.

3. The optical modulator according to claim 2, wherein, at the optical input portion or optical output portion of the optical waveguide, a width of the thin plate gradually changes along the optical waveguide.

4. The optical modulator according to claim 2, wherein the thin plate has a shape of cutaway portion.

5. The optical modulator according to claim 1, wherein, at the optical input portion or optical output portion of the optical waveguide, a width of the thin plate gradually changes along the optical waveguide.

6. The opticalmodulator according to claim 5, wherein the thin plate has a shape of cutaway portion.

7. The optical modulator according to claim 1, wherein the thin plate has a shape of cutaway portion.

8. An optical modulator comprising
a thin plate made of an electrooptic material,
an optical waveguide formed on a top or bottom surface of the thin plate, and
a modulation electrode comprising a signal electrode and a ground electrode formed on the top surface of the thin plate to modulate light passing through the optical waveguide,
wherein the thickness of the thin plate is constant throughout a portion of the thin plate where the modulation electrode is formed, and the thickness of the thin plate is 20 μm or less throughout the portion of the thin plate where the modulation electrode is formed, and
wherein a thickness of an end portion of the thin plate at a non-branched optical input portion or at a non-branched optical output portion of the optical waveguide is 1.1 times or more the thickness of the end portion of the thin plate apart from the optical input portion or the optical output portion of the optical waveguide.

9. The optical modulator according to claim 8, wherein, at the end portion of the thin plate at the optical input or optical output portion of the optical waveguide, an external member having substantially the same refractive index as the thin plate is disposed on the top or bottom surface of the thin plate.

10. The optical modulator according to claim 9, wherein a width of the end portion of the thin plate at the optical input or optical output portion of the optical waveguide is two times or less a total thickness of the end portion of the thin plate.

11. The optical modulator according to claim 9, wherein the end portion of the thin plate has a shape of taper of which thickness is enlarged in vicinities of the optical input and optical output end portions.

12. The optical modulator according to claim 9, wherein the end portion of the thin plate has a shape of taper of which width is narrowed in vicinities of the optical input and optical output end portions.

13. The optical modulator according to claim 8, wherein a width of the end portion of the thin plate at the optical input or optical output portion of the optical waveguide is two times or less a total thickness of the end portion of the thin plate.

14. The optical modulator according to claim 13, wherein the end portion of the thin plate has a shape of taper of which thickness is enlarged in vicinities of the optical input and optical output end portions.

15. The optical modulator according to claim 13, wherein the end portion of the thin plate has a shape of taper of which width is narrowed in vicinities of the optical input and optical output end portions.

16. The optical modulator according to claim 8, wherein the end portion of the thin plate has a shape of taper of which thickness is enlarged in vicinities of the optical input and optical output end portions.

17. The optical modulator according to claim 16, wherein the end portion of the thin plate has a shape of taper of which width is narrowed in vicinities of the optical input and optical output end portions.

18. The optical modulator according to claim 8, wherein the end portion of the thin plate has a shape of taper of which width is narrowed in vicinities of the optical input and optical output end portions.

* * * * *